United States Patent
Yamamoto

[11] Patent Number: 5,948,992
[45] Date of Patent: Sep. 7, 1999

[54] SEMICONDUCTOR PRESSURE DETECTING DEVICE

[75] Inventor: Masahiro Yamamoto, Tokyo, Japan

[73] Assignee: Mitsubishi Denki Kabushiki Kaisha, Tokyo, Japan

[21] Appl. No.: 09/151,104

[22] Filed: Sep. 10, 1998

[30] Foreign Application Priority Data

Apr. 24, 1998 [JP] Japan .................................. 10-114783

[51] Int. Cl.⁶ ................................ G01L 9/00; G01L 9/16
[52] U.S. Cl. ................................................ 73/754
[58] Field of Search ................................ 73/754, 720, 721, 73/726, 727, 756; 257/414, 415, 416, 417, 418, 419, 420

[56] References Cited

U.S. PATENT DOCUMENTS 4,993,266  2/1991  Omura et al. ............................. 73/754
5,444,286  8/1995  Ichihashi .................................. 73/754

FOREIGN PATENT DOCUMENTS 64-61632  3/1989  Japan .
9-101219  4/1997  Japan .

*Primary Examiner*—William Oen
*Attorney, Agent, or Firm*—Oblon, Spivak, McClelland, Maier & Neustadt, P.C.

[57] ABSTRACT

In a semiconductor pressure detecting device, residual stress due to die bonding between pedestal seat and base member as well as stress due to welding between base member and cap are reduced. The semiconductor pressure detecting device comprises a semiconductor sensor element having a thin-walled pressure-receiving portion, a pedestal seat, a base member and a cap, wherein pressure fluid is introduced to a pressure chamber via pressure fluid introducing holes of the base member and the pedestal seat so that pressure of the fluid is detected by the semiconductor sensor element. Outer peripheral configuration of the bonding surface of the pedestal seat to the base member is rectangular shaped, and bonding length in the direction of the diagonal line of the rectangular shape is set based on a prescribed maximum operating pressure of the semiconductor pressure detecting device, conditions for generation of residual strain during a bonding process between the pedestal seat and the base member and conditions for generation of strain during a bonding process of the cap to the base member.

4 Claims, 3 Drawing Sheets

SEMICONDUCTOR PRESSURE DETECTING DEVICE

BACKGROUND OF THE INVENTION

The present invention relates to semiconductor pressure detecting devices and, in particular, to a semiconductor pressure detecting device which uses as a detecting element a semiconductor sensor element capable of detecting strain and/or stress that occurs to a thin-walled pressure-receiving portion.

As a kind of pressure detecting device, there has conventionally been known one which uses as a detecting element a semiconductor sensor element (hereinafter, abbreviated simply as sensor element when appropriate) capable of detecting strain and/or stress that occurs when pressure acts on a thin-walled diaphragm-like pressure-receiving portion by making use of the piezoresistance effect of semiconductor (for example, see Japanese Patent Laid-Open Publication HEI 9-101219).

With the use of such a type of sensor element, magnitude and/or change of the pressure acting on the pressure-receiving portion can be detected as magnitude and/or change of strain and/or stress with high accuracy, and then converted into an electric signal and outputted as such.

FIG. 4 is an explanatory view in longitudinal section showing the basic structure of a semiconductor pressure detecting device (hereinafter, abbreviated simply as pressure detecting device or as device when appropriate) according to a prior art example.

As shown in this figure, a pressure detecting device 101 according to this prior art example comprises a semiconductor sensor element 102 made of silicon (Si) single crystal and having a thin-walled diaphragm-like pressure-receiving portion 102a in central part, a silicon pedestal seat 103 for bonding and supporting the sensor element 102, and a metallic base member 104 for bonding and supporting the pedestal seat 103. On the counter-pedestal seat side of the base member 104, a pressure introducing pipe 104p is provided integrally.

The base member 104 has a body portion 104a for bonding and supporting the pedestal seat 103 on its upper face side, and a thin-walled flange portion 104f provided on the periphery of the body portion 104a. This flange portion 104f is formed integrally with the body portion 104a by compression molding the peripheral part of the body portion 104a with a press. To the flange portion 104f of this base member 104, a flange portion 111f provided on the periphery of an opening end of a metallic cap 111 is bonded. On the bonding surface of the flange portion 111f of this cap 111, a projection 111p of, for example, annular shape is formed. By fusing this projection 111p, projection welding is performed so that the two flange portions 104f and 111f are bonded to each other.

The pedestal seat 103 comprises a pair of fitting plates 103a, 103b opposed to each other with an annular groove 103g interposed therebetween. A fitting base portion 102b of the sensor element 102 is bonded to the upper face of the upper fitting plate 103b, while the lower face of the lower fitting plate 103a is bonded to the upper face of the body portion 104a of the base member 104.

In addition, to the body portion 104a of the base member 104, a plurality of lead wires 113 are fixed so as to pass therethrough along its thicknesswise direction. Each lead wire 113 is electrically connected to the sensor element 102 via a wire 112 made of, for example, gold (Au).

The outer surface of this sensor element 102 including the pressure-receiving portion 102a is covered with a coating gel layer 106 for use of surface protection after the wiring of the wires 112.

The sensor element 102 and the pedestal seat 103, as well as the pedestal seat 103 and the base member 104 are bonded together, respectively, by the so-called die bonding process so as to be sealed airtight and fluid-tight. As a result of this, an inner passage 104h (pressure fluid introducing hole) which passes through the base member 104 and its pressure introducing pipe 104p, and a pressure fluid introducing hole 103h which is provided in central part of the pedestal seat 103 so as to pass through the pedestal seat 103 are communicated with each other so that pressure fluid is introduced to a pressure chamber 109 formed between the inner wall of the sensor element 102 including the pressure-receiving portion 102a and the upper face of the pedestal seat 103.

In addition, a space defined by an outer surface of a unit body comprising the sensor element 102, the pedestal seat 103 and the base member 104, and by an inner wall surface of the cap 111 constitutes a vacuum chamber 110.

In such a pressure detecting device 101 as shown above, when the pedestal seat 103 and the base member 104 are bonded together by die bonding process, there occurs residual stress due to heat during the die bonding process because of a large difference in linear expansion coefficient between the materials of the pedestal seat 103, which is made of silicon, and the base member 104, which is made of metal.

Also, in such a pressure detecting device 101 as shown above, the flange portion 111f of the cap 111 and the flange portion 104f of the base member 104 are bonded together by projection welding in the final assembly step. During this welding, stress would occur to the surface of the body portion 104a of the base member 104.

For this reason, during the welding of the cap 111 and the base member 104, or upon occurrence of, for example, an impact applied to the pressure detecting device 101 after the welding, there would occur problems such as occurrence of a crack Cr (see broken curved line in FIG. 4) to the pedestal seat 103 made of silicon, which would cause the degree of vacuum of the vacuum chamber 110 to lower, or even without the occurrence of the crack Cr, variations of the pressure characteristic of the sensor element 102 by an effect of welding strain, which would cause the detection accuracy to deteriorate.

The residual stress that occurs during the die bonding process between the pedestal seat 103 and the base member 104 as well as the stress that occurs during the welding process between the flange portions 104f and 111f of the base member 104 and the cap 111 increases more and more with increasing size of the pedestal seat 103 (therefore, increasing area of a bonding surface 103f of the pedestal seat 103 to the base member 104), and with increasing size of the base member 104.

In the semiconductor pressure detecting device 101 as described above, in addition to the semiconductor sensor element 102 having a gauge resistor, various peripheral circuits such as a resistor circuit for adjusting electrical characteristics of the sensor element 102 are required. In recent years, however, there is a tendency that these peripheral circuits and the like are incorporated and integrated in the sensor element itself. In this case, the size of the semiconductor sensor element (particularly, its planar size) becomes larger than when the peripheral circuits and the like are formed on an additional board, so that the size of components (pedestal seat and base member) that support the sensor element also becomes larger inevitably.

Therefore, when the peripheral circuits are incorporated in the semiconductor sensor element, in which case the planar size of the pedestal seat and the base member has been increased resultantly, the aforementioned problems of residual stress and stress due to welding strain would occur more noticeably.

The above-mentioned publication (Japanese Patent Laid-Open Publication HEI 9-101219) has disclosed that a recessed portion is formed at a base-member-side end portion of the pressure fluid introducing hole of the pedestal seat so as to relax the thermal stress that the pedestal seat receives from the base member due to the difference in thermal expansion coefficient between the pedestal seat and the base member, by which reduction in measurement error due to the thermal stress is intended. However, the publication has no particular discussions on the problem of residual stress that occurs during the die bonding process between the pedestal seat 103 and the base member 104, or the problem of stress that occurs during the welding process between the base member 104 and the cap 111, neither does it cover countermeasures for those problems.

The present invention has been accomplished in view of these and other technical problems. An object of the present invention is therefore to provide a semiconductor pressure detecting device which can effectively reduce the residual stress that occurs due to the die bonding between pedestal seat and base member and the stress that occurs due to the welding between base member and cap.

In order to achieve the above object, according to a first aspect of the present invention, there is provided a semiconductor pressure detecting device comprising a semiconductor sensor element capable of detecting strain and/or stress that occurs to a thin-walled pressure-receiving portion, a pedestal seat for bonding and supporting the semiconductor sensor element, a base member for bonding and supporting the pedestal seat, and a cap member which is bonded to an outer peripheral portion, or its proximity, of the base member to cover the base member, the pedestal seat and the semiconductor sensor element, wherein pressure fluid is introduced to a pressure chamber formed between an inner wall including the pressure-receiving portion of the semiconductor sensor element and a sensor-element supporting surface of the pedestal seat via pressure fluid introducing holes provided in the base member and the pedestal seat, respectively, so that fluid pressure acting on the pressure chamber is detected by the semiconductor sensor element, and wherein outer peripheral configuration of a bonding surface of the pedestal seat to the base member is rectangular or generally rectangular shaped, and bonding length in a direction of a diagonal line of the rectangular shape is set based on a prescribed maximum operating pressure of the semiconductor pressure detecting device, conditions for generation of residual strain during a bonding process between the pedestal seat and the base member, and conditions for generation of strain during a bonding process of the cap to the base member.

Also, according to a second aspect of the present invention, in the semiconductor pressure detecting device, a hollow portion including part of the pressure fluid introducing hole is formed at the bonding portion between the pedestal seat and the base member, and the bonding length in the direction of the diagonal line is set by setting a planar size of the hollow portion at the bonding surface.

Further, according to a third aspect of the present invention, in the semiconductor pressure detecting device according to the second aspect of the invention, the hollow portion is formed in the pedestal seat.

Still further, according to a fourth aspect of the present invention, in the semiconductor pressure detecting device according to the second aspect of the invention, the hollow portion is formed in the base member.

In the first aspect of the present invention, the outer peripheral configuration of the bonding surface of the pedestal seat to the base member is rectangular or generally rectangular shaped and, with respect to this bonding surface, the bonding length in the direction of the diagonal line of the rectangular shape is set based on the prescribed maximum operating pressure of the semiconductor pressure detecting device, conditions for generation of residual strain during the bonding between the pedestal seat and the base member, and conditions for generation of strain during the bonding of the cap member to the base member. Accordingly, the bonding length in the direction of the diagonal line of the bonding surface can be set short within such a range that the residual stress that occurs due to the bonding between the pedestal seat and the base member and the stress that occurs due to the bonding of the cap member to the base member with application of the prescribed maximum operating pressure do not exceed the bonding strength between the pedestal seat and the base member.

That is, the bonding area between the pedestal seat and the base member can be reduced by setting short the longest portion of the bonding surface therebetween, so that residual stress that occurs due to the bonding between the pedestal seat and the base member can be reduced and that the effect on the pedestal seat by strain that occurs due to the bonding between the cap member and the base member can be suppressed. As a result, during the bonding between the cap member and the base member, or upon occurrence of, for example, an impact applied to the pressure detecting device after the bonding, such malfunctions as occurrence of cracks in the pedestal seat, which would cause the degree of vacuum of the vacuum chamber to lower, or even without the occurrence of the cracks, variations of the pressure characteristic of the sensor element by an effect of bonding strain, which would cause the detection accuracy to deteriorate, can be suppressed.

Also, according to the second aspect of the present invention, basically, the same effects as in the first aspect of the invention can be produced. In particular, the hollow portion including part of the pressure fluid introducing hole is formed at the bonding portion between the pedestal seat and the base member, and the bonding length in the direction of the diagonal line is set by setting the planar size of the hollow portion at the bonding surface, so that the setting of the bonding length can be achieved accurately. Also, since the hollow portion is formed in central part of the bonding portion between the pedestal seat and the base member, the effect of any strain that occurs due to the bonding between the cap member and the base member can be reduced reliably.

Further, according to the third aspect of the present invention, basically, the same effects as in the second aspect of the invention can be produced. In particular, since the hollow portion is formed in the pedestal seat, the hollow portion can be formed simply and reliably by working this pedestal seat.

Still further, according to the fourth aspect of the present invention, basically, the same effects as in the second aspect of the invention can be produced. In particular, since the hollow portion is formed in the base member, the hollow portion can be formed simply and reliably by working this base member.

DETAILED DESCRIPTION OF THE PREFERRED EMBODIMENTS

Hereinbelow, embodiments of the present invention are described in detail with reference to the accompanying drawings.

Figure 1:
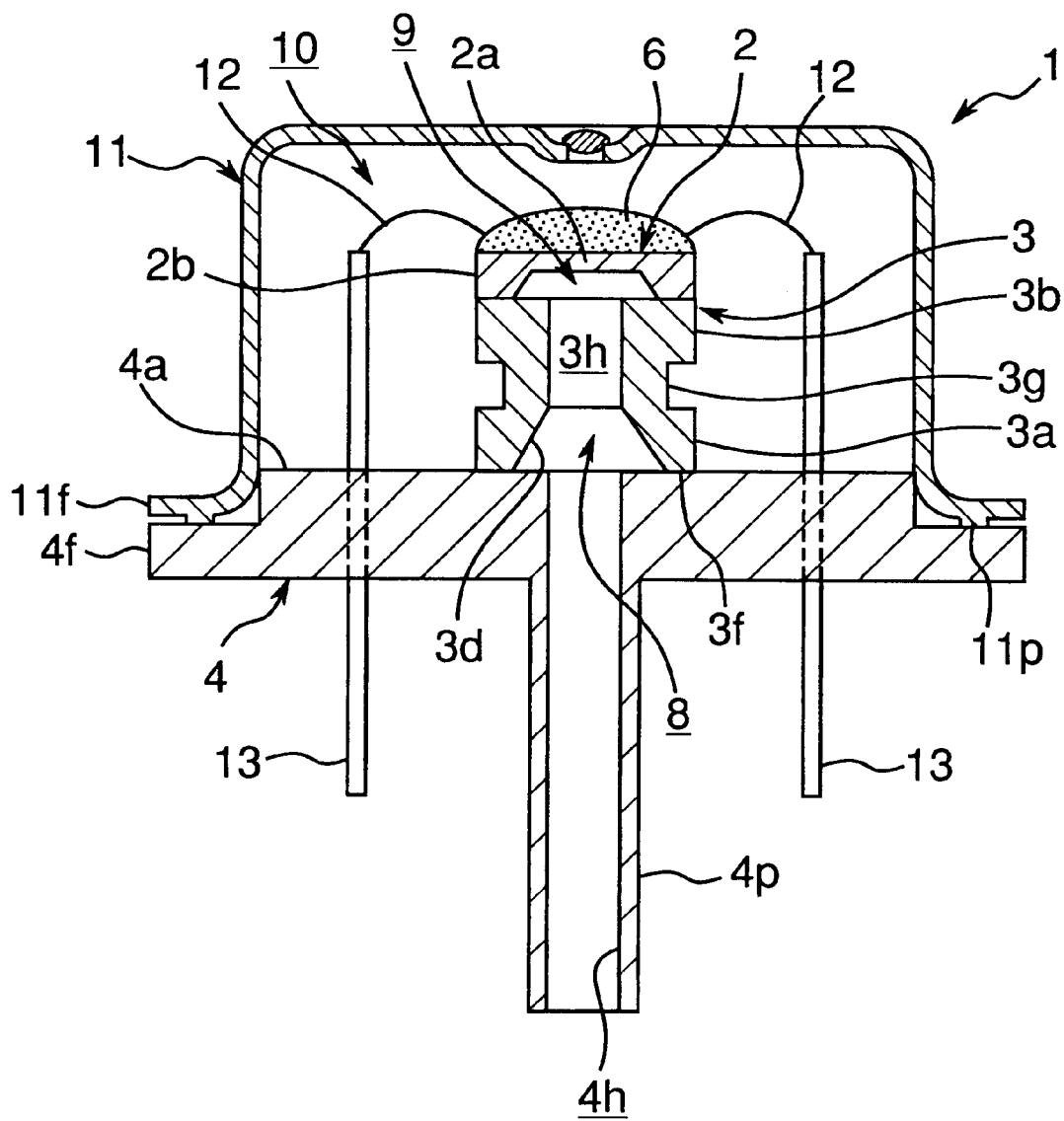
FIG. 1 is an explanatory view in longitudinal section of a semiconductor pressure detecting device according to a first embodiment of the present invention.

Embodiment 1:

First, a semiconductor pressure detecting device 1 (hereinafter, abbreviated simply as pressure detecting device or as device when appropriate) according to the first embodiment of the present invention as shown in FIG. 1.

FIG. 1 is an explanatory view in longitudinal section of the pressure detecting device 1 according to this embodiment. As shown in this figure, the pressure detecting device 1 comprises a semiconductor sensor element 2 (hereinafter, abbreviated simply as sensor element when appropriate) having a thin-walled diaphragm-like pressure-receiving portion 2a in central part, a pedestal seat 3 for bonding and supporting the sensor element 2, and a metallic base member 4 for bonding and supporting the pedestal seat 3.

These three components (sensor element 2, pedestal seat 3 and base member 4) constitute a unit body (sensor unit) in a bonded state in which they are stacked one on another. This sensor unit is covered at peripheral portion of its lower end opening with a metallic cap 11 bonded to peripheral portion of the base member 4.

On the lower face side (counter-pedestal seat side) of the base member 4, a pressure introducing pipe 4p for introducing fluid, which is to detect the pressure, into a pressure chamber 9 of the pressure detecting device 1 is integrally provided.

The semiconductor sensor element 2 detects magnitude and/or change of pressure by detecting strain and/or stress by using the piezoresistance effect of semiconductor, as is well known conventionally, where a diaphragm-type semiconductor sensor element made of, for example, silicon (Si) single crystal is used in this embodiment.

More specifically, the sensor element 2 is formed, for example, into a board material of a specified thickness having a rectangular shape in plan view and, as described above, a thin-film diaphragm-like pressure-receiving portion 2a is formed at its central part. Around this pressure-receiving portion 2a, a fitting base portion 2b is provided, the lower end face of the fitting base portion 2b being bonded to the upper face of the pedestal seat 3.

In addition, this semiconductor sensor element 2 is similar to the conventionally known one, and so omitted in detailed description and illustration as to its structure and operation and the like.

The pedestal seat 3 is made of, for example, silicon like the sensor element 2, and formed into a generally square block shape as a whole, and a pressure fluid introducing hole 3h passing therethrough thicknesswise is provided at its central part. The pedestal seat 3 comprises a pair of fitting portions 3a, 3b opposed to each other with an annular groove 3g interposed therebetween. The fitting base portion 2b of the sensor element 2 is bonded to the upper face of the upper fitting portion 3b, while the lower face of the lower fitting portion 3a is bonded to the upper face of the base member 4. In addition, since the pedestal seat 3 is square shaped, the upper-and-lower fitting portions 3a, 3b are rectangular shaped in plan view.

The annular groove 3g is positioned between the bonding surface 3f of the silicon pedestal seat 3 to the metallic base member 4 and the sensor element 2 in the state that the pedestal seat 3 is bonded to the sensor element 2 and the base member 4. Therefore, it can be relaxed that thermal stress applied to the pedestal seat 3 due to the difference in thermal expansion coefficient between the pedestal seat 3 and the base member 4 may adversely affect the detection accuracy and other characteristics of the sensor element 2.

On the upper and lower faces of the pedestal seat 3 (upper face of the upper fitting portion 3b and lower face of the lower fitting portion 3a) as well as on the lower face of the sensor element 2 (lower end face of the fitting base portion 2b), thin films of gold (Au) have previously been formed by, for example, vacuum deposition or sputtering process.

Then, while the sensor element 2 is placed with its fitting base portion 2b in contact with the upper face of the pedestal seat 3, they are bonded together under high temperature, so that the gold (Au) that has formed the thin films on the upper face of the upper fitting portion 3b of the pedestal seat 3 and the lower end face of the fitting base portion 2b of the sensor element 2 fuses and penetrates into the silicon (Si), by which a Au—Si alloy is formed. As a result, the fitting base portion 2b of the sensor element 2 is bonded and supported to the upper face of the upper fitting portion 3b of the pedestal seat 3, and moreover they are sealed airtight.

The base member 4 is formed into, for example, a circular disc shape having a specified or more thickness as a whole, and comprises a body portion 4a for bonding and supporting the pedestal seat 3 on its upper face side, and a flange portion 4f of a specified thickness provided on its peripheral side. This flange portion 4f is formed integrally with the body portion 4a, for example, by compression molding peripheral part of the body portion 4a with a press. Also, a pressure fluid introducing hole 4h is provided at central part of the body portion 4a of the base member 4 so as to pass therethrough in the thicknesswise direction.

This base member 4 is made of a metal material having a required strength as a support member for supporting the pedestal seat 3. Its material may be, for example, an iron (Fe)—nickel (Ni) alloy.

On the upper face of the central part (specified portion excluding the flange portion 4f) of the base member 4, a gold (Au) coating has previously been formed by, for example, plating process. Meanwhile, also on the lower face 3f (bonding surface to the base member 4) of the pedestal seat 3, a gold (Au) thin film has previously been formed by vacuum deposition or sputtering as described above. Since the lower fitting portion 3a of the pedestal seat 3 is rectangular shaped in plan view as described above, the peripheral configuration of the bonding surface 3f of the pedestal seat 3 to the base member 4 is rectangular shaped as can be well understood from FIG. 2.

Then, while the pedestal seat 3 having the sensor element 2 is placed on the upper face of central part of the gold-plated base member 4, die bonding process is carried out under high temperature so that the pedestal seat 3 is bonded and supported to the upper face of the base member 4, both the members being sealed airtight.

To the peripheral flange portion 4f of the base member 4, the flange portion 11f of a specified thickness formed in peripheral part of the lower end opening of the metallic cap 11 is bonded by, for example, projection welding under vacuum. On the bonding surface of this flange portion 11f of the cap 111, a projection 111p of, for example, annular shape is formed. By fusing this projection 11p, projection welding is performed so that the two flange portions 4f and 11f are bonded to each other.

In addition, to the body portion 4a of the base member 4, a plurality of lead wires 13 are fixed so as to pass therethrough along its thicknesswise direction. Each lead wire 13 is electrically connected to the sensor element 2 via a wire 12 made of, for example, gold (Au).

The outer surface of this sensor element 2 including the pressure-receiving portion 2a is covered with a coating gel layer 6 for use of surface protection after the wiring of the wires 12.

The sensor element 2 and the pedestal seat 3, as well as the pedestal seat 3 and the base member 4 are bonded together, respectively, by the so-called die bonding process so as to be sealed airtight and fluid-tight as described above. As a result of this, an inner passage 4h (pressure fluid introducing hole) which passes through the base member 4 and its pressure introducing pipe 4p, and the pressure fluid introducing hole 3h which is provided in central part of the pedestal seat 3 so as to pass through the pedestal seat 3 are communicated with each other so that fluid to detect the pressure is introduced to the pressure chamber 9 formed between the inner wall of the sensor element 2 including the pressure-receiving portion 2a and the upper face of the pedestal seat 3.

In addition, a space defined by an outer surface of a sensor unit comprising the sensor element 2, the pedestal seat 3 and the base member 4, and by an inner wall surface of the cap 11 constitutes the vacuum chamber 10. The internal pressure of the vacuum chamber 10 serves as the reference pressure for detecting the pressure in the pressure chamber 9.

In the sensor element 2, more preferably, peripheral circuits and the like such as a resistor circuit for adjusting electrical characteristics of the sensor element 2 are incorporated and integrated in addition to a gauge resistor for detecting strain and/or stress. Therefore, the size (in particular, planar size) of the sensor element 2 itself as well as the pedestal seat 3 and the base member 4 for supporting the sensor element 2 has been increased resultantly, as compared with the case in which the peripheral circuits and the like are formed on an additional board.

Strain and/or stress (i.e., pressure acting on the pressure chamber 9) that has occurred to the pressure-receiving portion 2a of the sensor element 2 is converted into an electrical signal. The electrical signal thus obtained is outputted to outside via the wires 12 and the lead wires 13.

Figure 2:
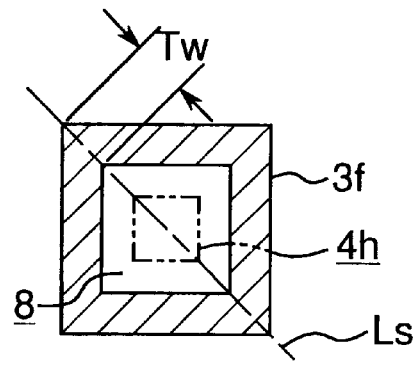
FIG. 2 is an explanatory view showing the bonding surface of the pedestal seat of the semiconductor pressure detecting device according to the first embodiment.

In this embodiment, as described above, the peripheral configuration of the bonding surface 3f of the pedestal seat 3 to the base member 4 is rectangular shaped (see FIG. 2). Then, in order to effectively reduce the residual stress that occurs during the die bonding between the pedestal seat 3 and the base member 4 and the stress that occurs during the welding between the base member 4 and the cap 11, a bonding length Tw in the direction of a diagonal line Ls of the rectangular shape is set based on a prescribed maximum operating pressure of the semiconductor pressure detecting device 1, conditions for generation of residual strain during the die bonding between the pedestal seat 3 and the base member 4 and conditions for generation of strain during the bonding of the cap 11 to the base member 4.

Concretely, a hollow portion 8 including part of the pressure fluid introducing hole 3h is formed at the bonding portion between the pedestal seat 3 and the base member 4, and the bonding length Tw in the direction of the diagonal line Ls is set by setting the planar size of this hollow portion 8 at the bonding surface 3f.

In particular, the bonding length Tw in the direction of the diagonal line Ls of the bonding surface 3f is set to a short one within such a range that the residual stress that occurs due to the bonding between the pedestal seat 3 and the base member 4 and the stress that occurs due to the bonding between the cap 11 and the base member 4 with application of the prescribed maximum operating pressure of the semiconductor pressure detecting device 1 do not exceed the bonding strength between the pedestal seat 3 and the base member 4.

In this case, the hollow portion 8 is formed in the pedestal seat 3 by performing tapering process (tapered surface 3d)

so that the diameter of the lower fitting portion 3a of the pedestal seat 3 increases toward the lower surface side.

The residual stress that occurs due to the die bonding between the pedestal seat 3 and the base member 4 is affected by the size and configuration of the bonding surface 3f of the pedestal seat 3 to the base member 4, where the larger the bonding surface 3f is, the larger the maximum value of the residual stress is. Also, when the pedestal seat 3 is square shaped and the peripheral configuration of the bonding surface 3f is rectangular, the maximum value occurs in the direction of the diagonal line Ls in which the bonding length is the longest.

Therefore, the residual stress that occurs to the pedestal seat 3 during the die bonding between the pedestal seat 3 and the base member 4 can be reduced by setting the bonding length Tw in the direction of the diagonal line Ls to the shortest possible so that the area of the bonding surface 3f of the pedestal seat 3 to the base member 4 is reduced. In addition, the maximum value of this residual stress occurs to near an outer corner portion of the rectangular shape of the bonding surface 3f.

Also, when the flange portion 4f of the base member 4 and the flange portion 11f of the cap 11 are welded to each other, the amount of displacement that occurs to the base member 4 due to this welding is in inverse proportion to a cube of the thickness of the base member 4, and in proportion to a square of the diameter of the base member 4. Then, the amount of displacement becomes maximum at central part of the base member 4 (more particularly, vicinities of the peripheral part of the pressure fluid introducing hole 4h of the body portion 4a). In addition, this maximum amount of displacement can be obtained by sticking a strain gauge to near the peripheral part of the pressure fluid introducing hole 4h of the body portion 4a of the base member 4 and then measuring the maximum strain during the welding.

Therefore, forming the hollow portion 8 at the bonding portion between the pedestal seat 3 and the base member 4 as described above makes it possible to suppress the effect on the pedestal seat 3 by the strain that occurs due to the bonding between the cap 11 and the base member 4.

The setting of the bonding length Tw in the direction of the diagonal line Ls of the bonding surface 3f is achieved, for example, in the following way. In this case, the bonding length Tw is treated as a value that varies with the peripheral configuration of the bonding surface 3f maintained constant.

First, a stress $\sigma_1$ that occurs to the bonding surface 3f under the action of the prescribed maximum operating pressure (e.g., 10 kg/cm$^2$) of the semiconductor pressure detecting device 1 is calculated based on the area of the hollow portion 8 at its most enlarged diameter portion. The area of the bonding surface 3f can be represented as a function of the bonding length Tw.

Also, as to the residual stress that occurs during the die bonding between the pedestal seat 3 and the base member 4, data of values of this residual stress that vary along the diagonal line Ls are previously acquired and the residual stress value $\sigma_2$ is represented as a function of the bonding length Tw.

Further, as to the stress that occurs to the base member 4 due to the welding between the flange portion 4f of the base member 4 and the flange portion 11f of the cap 11, data of values of this stress that vary along the diagonal line Ls are previously acquired, and the stress value $\sigma_3$ is represented as a function of the bonding length Tw.

Then, the bonding length Tw of the bonding surface 3f in the direction of the diagonal line Ls is set to a short one within such a range that the residual stress $\sigma_2$ that occurs due to the bonding between the pedestal seat 3 and the base member 4 and the stress $\sigma_3$ that occurs due to the bonding between the cap 11 and the base member 4 with application of the prescribed maximum operating pressure of the semiconductor pressure detecting device 1 (with the stress $\sigma_1$ that occurs to the bonding surface 3f) do not exceed the die bonding strength $\sigma_B$ (e.g., 25 kg/cm$^2$) between the pedestal seat 3 and the base member 4.

That is, this bonding length Tw is set small so as to satisfy the following equation $\hat{1}$, where the character k ($k \geq 1$) in this equation $\hat{1}$ is the safety factor for determining the bonding length Tw:

$$\sigma_B \geq k(\sigma_1 + \sigma_2 + \sigma_3) \qquad \hat{1}$$

As described above, according to this embodiment, the bonding length Tw in the direction of the diagonal line Ls of the bonding surface 3f is set to a short one within such a range that the residual stress $\sigma_2$ that occurs due to the bonding between the pedestal seat 3 and the base member 4 and the stress $\sigma_3$ that occurs due to the bonding between the cap 11 and the base member 4 with application of the prescribed maximum operating pressure of the semiconductor pressure detecting device 1 (with the stress $\sigma_1$ that occurs to the bonding surface 3f) do not exceed the die bonding strength $\sigma_B$ (e.g., 25 kg/cm$^2$) between the pedestal seat 3 and the base member 4. Therefore, during the bonding of the cap 11 and the base member 4, or upon occurrence of, for example, an impact applied to the pressure detecting device 1 after the bonding, such malfunctions as occurrence of cracks in the pedestal seat 3, which would cause the degree of vacuum of the vacuum chamber 10 to lower, or even without the occurrence of the cracks, variations of the pressure characteristic of the sensor element 2 by an effect of bonding strain, which would cause the detection accuracy to deteriorate, can be suppressed.

In particular, the hollow portion 8 including part of the pressure fluid introducing hole 3h of the pedestal seat 3 is formed at the bonding portion between the pedestal seat 3 and the base member 4, and the bonding length Tw in the direction of the diagonal line Ls is set by setting the planar size of the hollow portion 8 at the bonding surface 3f, so that the setting of the bonding length Tw can be achieved accurately. Also, since the hollow portion 8 is formed in central part of the bonding portion between the pedestal seat 3 and the base member 4, the effect of any strain (deformation) that occurs due to the bonding between the cap 11 and the base member 4 can be reduced reliably.

Further, in this case, since the hollow portion 8 is formed in the pedestal seat 3, the hollow portion 8 can be formed simply and reliably by working (e.g., cutting work) this pedestal seat 3.

Embodiment 2:

Next, a semiconductor pressure detecting device according to the second embodiment of the present invention is described. In the following description, the same components as in the first embodiment are designated by like reference numerals and their further description is omitted.

Figure 3:
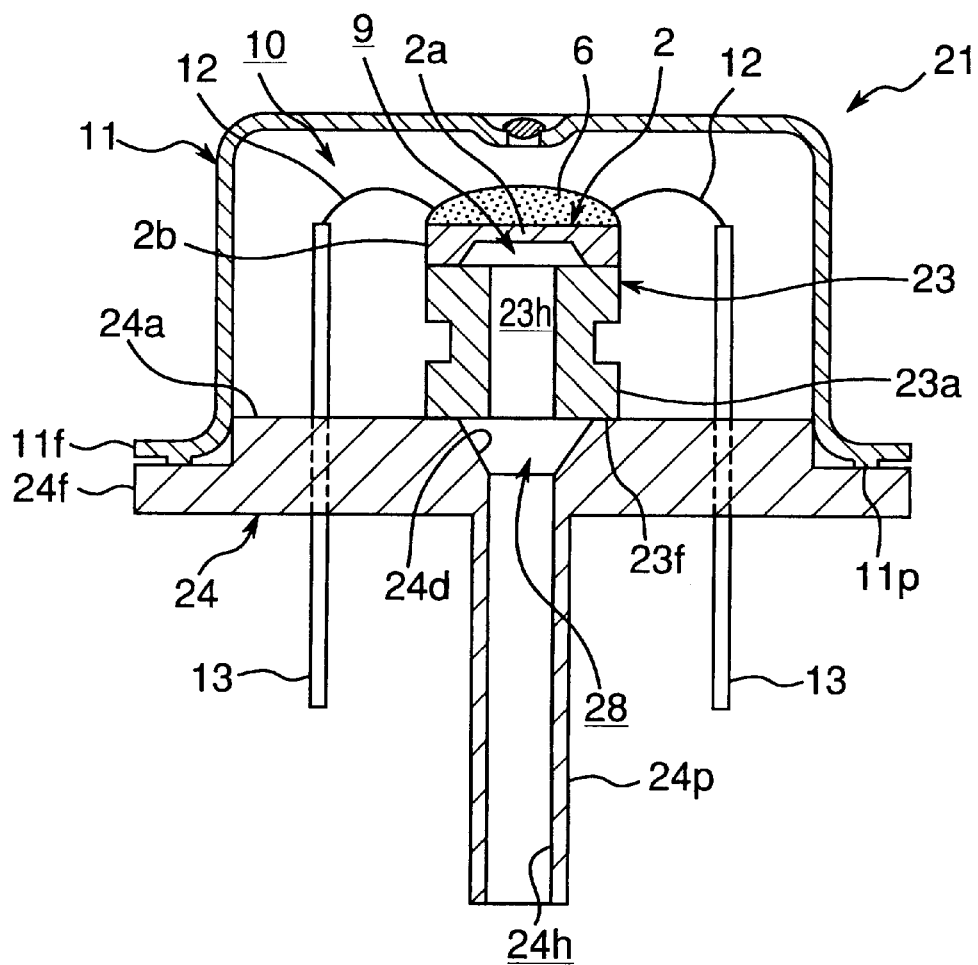
FIG. 3 is an explanatory view in longitudinal section of a semiconductor pressure detecting device according to a second embodiment of the present invention.
Figure 4:
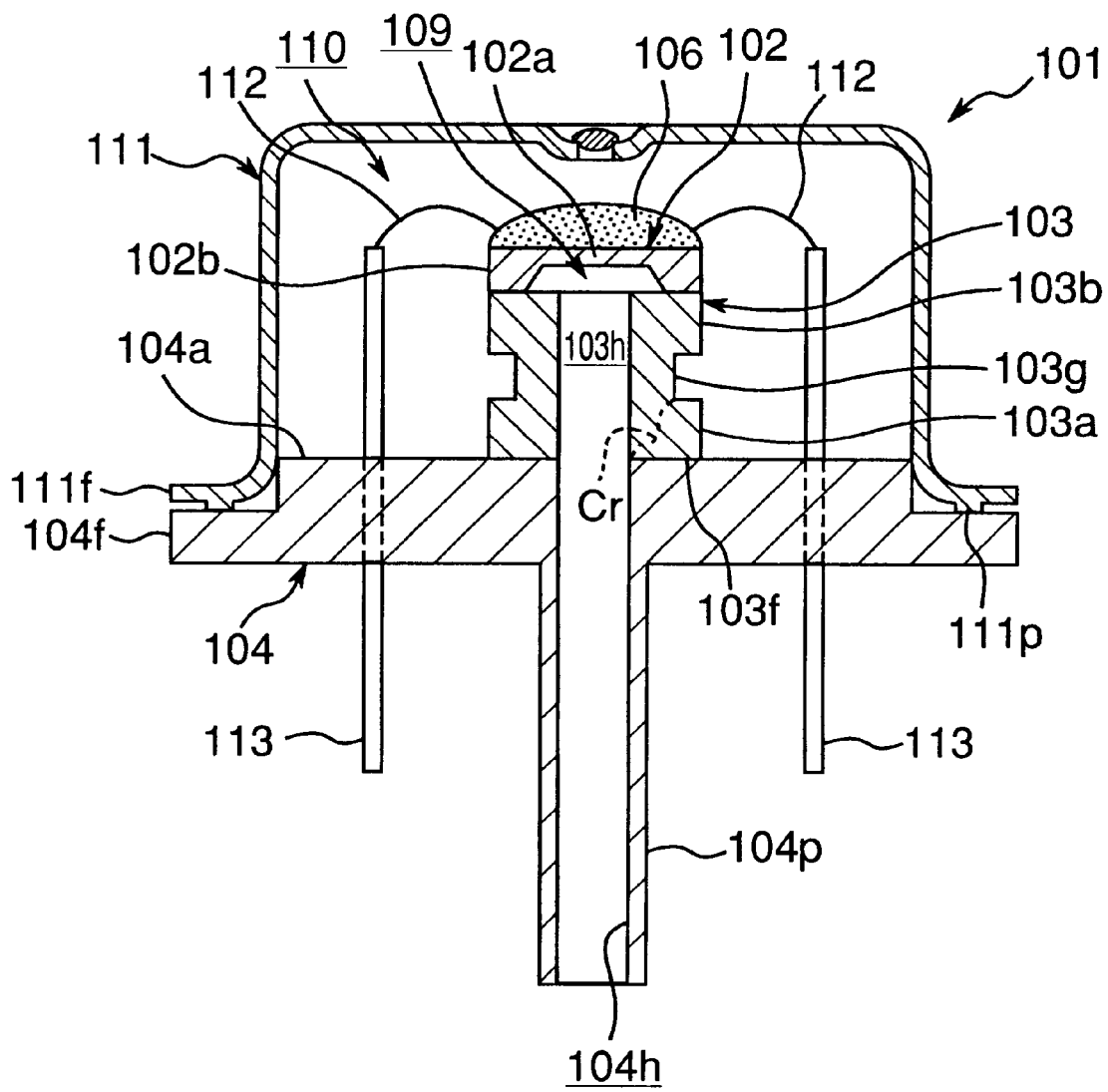
FIG. 4 is an explanatory view in longitudinal section of a semiconductor pressure detecting device according to the prior art.

As shown in FIG. 3, in a semiconductor pressure detecting device 21 according to this second embodiment, a hollow portion 28 to be formed at the bonding portion between a pedestal seat 23 and a base member 24 is provided in the base member 24. This hollow portion 28 is provided by, for example, tapering (tapered surface: 24d) central part including a pressure fluid introducing hole 24h communicating with the interior of a pressure introducing pipe 24p during the process of molding the base member 24.

By providing the hollow portion 28, the area of a bonding surface 23f forming part of the lower end face of a lower fitting portion 23a of the pedestal seat 23 is reduced, thus allowing the same effects as in the first embodiment to be produced.

In this case, since the hollow portion 28 is formed in the base member 24, the hollow portion 28 can be formed simply and reliably by working this base member 24. Particularly when the base member 24 is made by press molding, the hollow portion 28 can be formed simultaneously when the body portion 24a and flange portion 24f of the base member 24 are integrally molded, without the need of separately performing cutting or other process.

The present invention is not limited to the above-mentioned embodiments, and it is needless to say that various improvements and design changes may be made without departing the sprit of the invention.

What is claimed is:

1. A semiconductor pressure detecting device comprising a semiconductor sensor element capable of detecting strain and/or stress that occurs to a thin-walled pressure-receiving portion, a pedestal seat for bonding and supporting the semiconductor sensor element, a base member for bonding and supporting the pedestal seat, and a cap member which is bonded to an outer peripheral portion, or its proximity, of the base member to cover the base member, the pedestal seat and the semiconductor sensor element, wherein pressure fluid is introduced to a pressure chamber formed between an inner wall including the pressure-receiving portion of the semiconductor sensor element and a sensor-element supporting surface of the pedestal seat via pressure fluid introducing holes provided in the base member and the pedestal seat, respectively, so that fluid pressure acting on the pressure chamber is detected by the semiconductor sensor element, and wherein outer peripheral configuration of a bonding surface of the pedestal seat to the base member is rectangular or generally rectangular shaped, and bonding length in a direction of a diagonal line of the rectangular shape is set based on a prescribed maximum operating pressure of the semiconductor pressure detecting device, conditions for generation of residual strain during a bonding process between the pedestal seat and the base member, and conditions for generation of strain during a bonding process of the cap to the base member.

2. The semiconductor pressure detecting device according to claim 1, wherein a hollow portion including part of the pressure fluid introducing hole is formed at the bonding portion between the pedestal seat and the base member, and wherein the bonding length in the direction of the diagonal line is set by setting a planar size of the hollow portion at the bonding surface.

3. The semiconductor pressure detecting device according to claim 2, wherein the hollow portion is formed in the pedestal seat.

4. The semiconductor pressure detecting device according to claim 2, wherein the hollow portion is formed in the base member.

* * * * *